(12) United States Patent
Kholaif et al.

(10) Patent No.: US 8,427,991 B2
(45) Date of Patent: Apr. 23, 2013

(54) HANDLING WRONG WEP KEY AND RELATED BATTERY DRAIN AND COMMUNICATION EXCHANGE FAILURES

(75) Inventors: Ahmad Mohammad Kholaif, Hamilton (CA); Ion Barbu, Waterloo (CA); Nayef Fawaz Mendahawi, Kitchener (CA); Krishna Kumar Bakthavathsalu, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 388 days.

(21) Appl. No.: 12/758,898

(22) Filed: Apr. 13, 2010

(65) Prior Publication Data

US 2011/0085447 A1 Apr. 14, 2011

Related U.S. Application Data

(60) Provisional application No. 61/250,549, filed on Oct. 11, 2009, provisional application No. 61/250,544, filed on Oct. 11, 2009.

(51) Int. Cl.
*H04B 7/00* (2006.01)

(52) U.S. Cl.
USPC .............................................. 370/311; 726/4

(58) Field of Classification Search .................. 370/311; 725/2–7, 16–21
See application file for complete search history.

(56) References Cited

U.S. PATENT DOCUMENTS

| 7,886,343 | B2 | 2/2011 | Sullivan et al. | |
|---|---|---|---|---|
| 2002/0009199 | A1* | 1/2002 | Ala-Laurila et al. | .......... 455/411 |
| 2004/0090930 | A1 | 5/2004 | Lee et al. | |
| 2004/0236939 | A1* | 11/2004 | Watanabe et al. | ............. 713/150 |
| 2008/0295144 | A1* | 11/2008 | Cam-Winget et al. | ............ 726/1 |
| 2009/0245176 | A1 | 10/2009 | Balasubramanian et al. | |

FOREIGN PATENT DOCUMENTS

| EP | 1530322 | 5/2005 |
|---|---|---|
| EP | 1545146 | 6/2005 |

OTHER PUBLICATIONS

3GPP system to Wireless Local Area Network (WLAN) interworking; System description; 3GPP TS 23.234 V6.5.0, 2005.
Larcinese, Concetta , Extended European Search Repo for EP 10159813.4, Oct. 13, 2010.
Team Digit, "Online Over the Air", http://www.thinkdigit.com/General/Online-Over-The-Air_1236.html, Jun. 1, 2006.
Yacc, "reply to Question for WEP Key when it is wrong inserted", http://old.nabble.com/Question-for-WEP-Key-when-it-is-wrong-inserted-td15847726.html, Mar. 28, 2008.
Truong, Thanhnga B. , Second Office Action for U.S. Appl. No. 12/900,774, Jan. 15, 2013.

* cited by examiner

*Primary Examiner* — Pao Sinkantarakorn
(74) *Attorney, Agent, or Firm* — Integral Intellectual Property Inc.; Miriam Paton

(57) ABSTRACT

A power reduction mechanism in a mobile communications device detects the use of a wrong WEP encryption key in the establishment of a WLAN connection between the mobile device and an access point for both static and dynamic IP WLAN profiles. The power reduction mechanism detects an incorrect WEP key; authentication failure; failure to acquire an IP address for dynamic IP WLAN profiles; decryption errors; and broadcast/multicast frames from the handset not being redirected back to the BSS by the AP. Upon such detection, the mobile device takes one or more power conserving actions, e.g., adding the AP/profile to a ban list; attempting WLAN association for a banned AP/profile at longer intervals than for a non-banned AP/profile; skipping an AP/profile on the ban list for a time duration defined by a timer to conserve power; and flagging the banned AP/profile with a special mark to indicate it is banned.

20 Claims, 13 Drawing Sheets

HANDLING WRONG WEP KEY AND RELATED BATTERY DRAIN AND COMMUNICATION EXCHANGE FAILURES

CROSS-REFERENCE TO RELATED APPLICATIONS

This application claims the benefit under 35 U.S.C. 119(e) of U.S. Provisional Patent Application No. 61/250,549 entitled "Handling wrong WEP key and related battery drain and communication exchange failures" filed Oct. 11, 2009, which is incorporated herein by reference. This application claims the benefit under 35 U.S.C. 119(e) of U.S. Provisional Patent Application No. 61/250,544 entitled "Authentication Failure in a Wireless Local Area Network" filed Oct. 11, 2009, which is incorporated herein by reference.

TECHNICAL FIELD

The power reduction mechanism relates to the field of data communications, and more particularly relates to a system and method for handling incorrect Wired Equivalent Privacy (WEP) key and related battery drain and communication exchange failures on a mobile communications device.

BACKGROUND

Current wireless mobile communication devices include microprocessors, memory, soundcards, and run one or more software applications in addition to providing for voice communications. Examples of software applications used in these wireless devices include micro-browsers, address books, email clients, instant messaging (IM) clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol (WAP), which integrates the Internet and other networks with wireless network platforms. Such wireless devices may operate on a cellular network, on a wireless local area network (WLAN), or on both of these types of networks.

With respect to WLANs, the term Wi-Fi or Wireless Fidelity pertains to certain types of WLANs that use specifications in the Institute of Electrical and Electronics Engineers ("IEEE") 802.11 family.

In a WLAN, an access point is a station that transmits and receives data (sometimes referred to as a transceiver). An access point in an infrastructure BSS (or a client node acting as an AP in an Independent BSS) connects users to other users within the network and also can serve as the point of interconnection between the WLAN and a wired LAN. Each access point can serve multiple users within a defined network area. As users move beyond the range of one access point (i.e., when they roam), they are automatically handed over to the next one. A small WLAN may only require a single access point. The number of access points required increases as a function of the number of network users and the physical size of the network. The access point is typically an IEEE 802.11 (i.e. Wi-Fi or WLAN) radio receiver/transmitter (or transceiver) and functions as a gateway or bridge between a WLAN and a wired LAN.

A block diagram illustrating an example wireless communications system is shown in FIG. 1. The example system, generally referenced 10, comprises one or more mobile devices 12 implementing a WLAN station connected to access point (AP) 14 which is connected to network 16. Also connected to network 16 are computer 18 and DHCP server 20.

A service set identifier (SSID) identifies a particular IEEE 802.11 wireless LAN. A client device receives broadcast messages from all access points within range advertising their SSIDs. The client device can then either manually or automatically select the network with which to associate. It is legitimate for multiple access points to share the same SSID if they provide access to the same network as part of an extended service set.

The basic service set (BSS) is the basic building block of an IEEE 802.11 wireless LAN. In infrastructure mode one access point (AP) together with all associated stations (STAs) is called a BSS. An AP acts as a master to control the stations within that BSS. Each BSS is identified by a Basic Service Set Identifier (BSSID). The most basic BSS is two STAs in Independent mode. In infrastructure mode, a basic BSS consists of one AP and one STA. The BSSID uniquely identifies each BSS (the SSID however, can be used in multiple, possibly overlapping, BSSs). In an infrastructure BSS, the BSSID is the MAC address of the wireless access point (AP).

When a station wants to access an existing BSS (such as after power-up, sleep mode or just entering a BSS area), the station must get synchronization information from the Access Point. The station obtains this information by either (1) passive scanning whereby the station waits to receive a Beacon frame (and/or Probe Responses sent in response to other stations' Probe Requests) from the Access Point; or (2) active scanning whereby the station attempts to find an Access Point by transmitting Probe Request frames and waiting for a Probe Response from the Access Point. Note that the Beacon frame is a periodic frame sent by the Access Point containing synchronization information.

Once the station has found an Access Point, in order to join the BSS, it must perform the Authentication Process which involves the exchange of information between the Access Point and the station, where each side shows knowledge of a shared credential(s).

Once authenticated, the station begins the Association Process which involves the exchange of information about the station and BSS capabilities. Only after the association process is complete, is the station permitted to transmit and receive data frames with the Access Point.

In implementing the WLAN protocol, communications devices often utilize so called WLAN profiles to aid in establishing connections between stations and access points. A wireless local area network profile defines the parameters for the connection between the station and WLAN networks including access points. Profiles typically include connection related information including, for example, SSID, connection type (i.e., open or shared key), security, authentication, encryption, WEP shared keys, key length, frequency bands, roaming enable/disable, SSID broadcasted, etc.

Wireless devices are typically battery operated. As such, conserving battery power is important as doing so allows the wireless device to operate for an extended period of time. To conserve battery power, the wireless device will typically enter a "sleep mode" when it is not actively participating in a communication. During this sleep mode the wireless device will still monitor activity on the WLAN to determine if it should "wake up" and enter into a communication.

The IEEE 802.11 standard defines several services that govern how two IEEE 802.11 devices communicate. As part of the connection process, the station listens for messages from any access points that are in range. If the station finds a message from an access point that has a matching SSID, it sends an authentication request to the access point. The access point authenticates the station and the station sends an association request to the access point. The access point then associates with the station and the station can communicate with the network through the access point. An access point must authenticate a station before the station can associate with the access point or communicate with the network. The IEEE 802.11 standard defines two types of WEP authentication: Open System and Shared Key. Open System Authentication allows any device to join the network, assuming that the device SSID matches the access point SSID. In Open System authentication, the WLAN client need not provide its credentials to the Access Point during authentication. Thus, any client, regardless of its WEP keys, can authenticate itself with the Access Point and then attempt to associate. Alternatively, the device can associate with any available access point within range, regardless of its SSID. The following steps occur when two devices use Open System Authentication. First, the station sends an authentication request to the access point. The access point authenticates the station. The station then associates with the access point and joins the network.

In Shared Key Authentication WEP is used for authentication thus the station and the access point must have the same WEP key to authenticate. The following four-way challenge-response handshake is used. First, the station sends an authentication request to the access point. The access point sends a clear-text challenge to the station. The station uses its configured default key to encrypt the challenge text and sends the encrypted text back to the access point. The access point decrypts the encrypted text using its configured WEP key that corresponds to the station's default key. The access point compares the decrypted text with the original challenge text. If the decrypted text matches the original challenge text, then the access point and the station share the same WEP key, and the access point authenticates the station. The station connects to the network and WEP can be used for encrypting/decrypting the data frames. If the decrypted text does not match the original challenge text (that is, the access point and station do not share the same WEP key), then the access point will refuse to authenticate the station, and the station will be unable to communicate with either the IEEE 802.11 network or wired Ethernet network accessed only through the IEEE 802.11 network.

Thus, in order for a WLAN capable device (e.g., a smart phone or a laptop) to connect to a WLAN access point (AP), the device must first complete the association then the authentication phases. During association, both the device and AP negotiate the profile SSID, frequency band, data rates and transmit power levels for the WLAN connection. When association is completed (for PSK and EAP), the device must then authenticate itself to the AP prior to the data exchange phase. Authentication is done using the appropriate security credentials depending on the authentication protocol configured at the AP. Examples of authentication credentials include MAC filtering, pass-phrase, username-password, etc. Some WLAN profiles are open system profiles, i.e., require no authentication to grant network access. Hotspot profiles are usually open system profiles and can be found at metropolitan areas such as airports, coffee-shops, public libraries, etc. Network administrators, however, can still configure an open system WLAN profile to use an encryption mechanism in order to further protect the data packets exchanged between the AP and the handsets. Encryption algorithms include WEP, TKIP, AES, etc. Despite its security vulnerabilities for short (40 bit) keys, WEP is still commonly used for data encryption with longer and stronger keys enabled (104 or 256 bit long). For example, most hotspot installations are usually configured to use open system WLAN profiles with WEP as the encryption protocol.

BRIEF DESCRIPTION OF THE DRAWINGS

The power reduction mechanism is herein described, by way of example only, with reference to the accompanying drawings, wherein.

DETAILED DESCRIPTION

Notation Used Throughout

Figure 1:
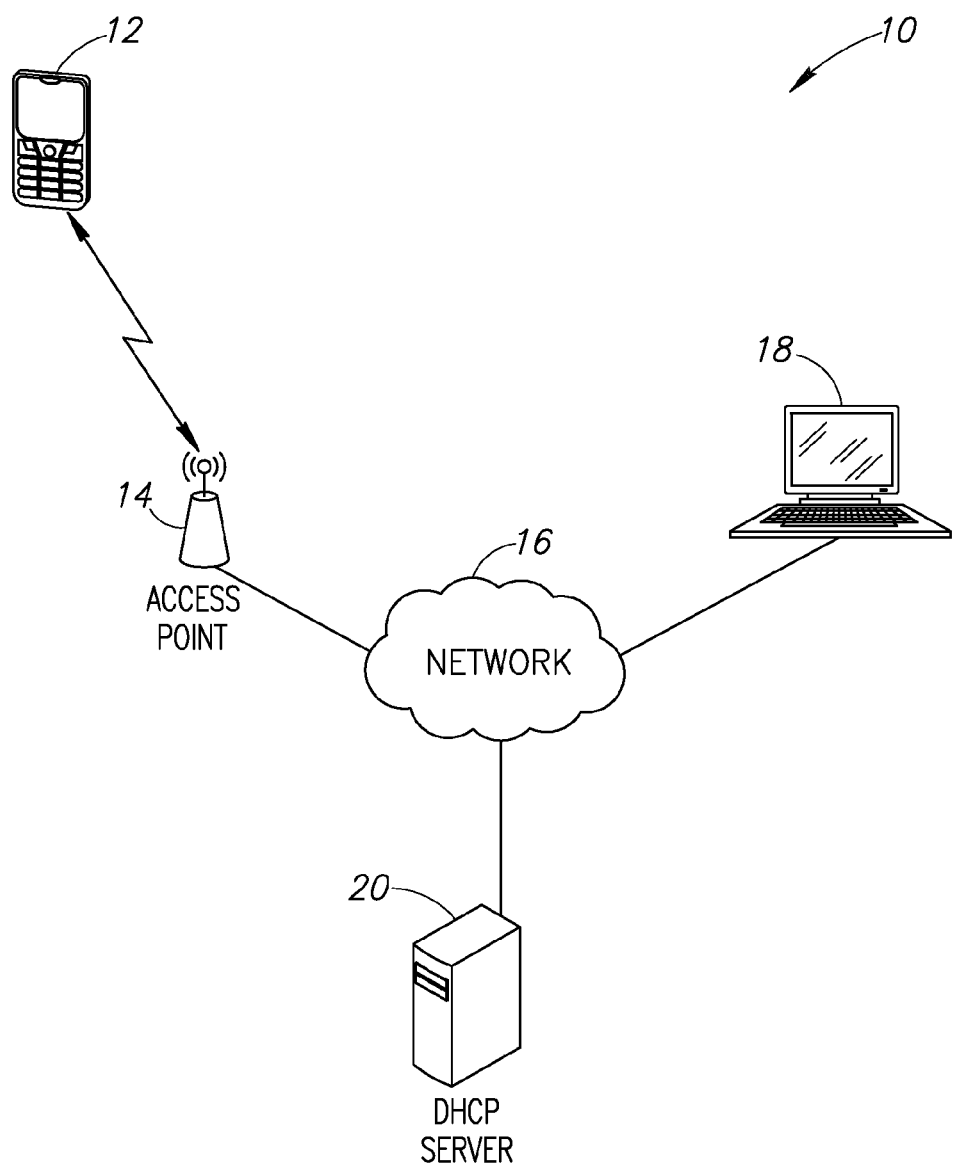
FIG. 1 is a block diagram illustrating an example wireless communications system.

The following notation is used throughout this document:

| Term | Definition |
| --- | --- |
| AP | Access Point |
| ARP | Address Resolution Protocol |
| ASIC | Application Specific Integrated Circuit |
| BSS | Basic Service Set |
| BSSID | Basic Service Set ID |
| CDROM | Compact Disc Read Only Memory |
| CPU | Central Processing Unit |
| DHCP | Dynamic Host Control Protocol |
| DNS | Domain Name Server |
| DSP | Digital Signal Processor |
| EDGE | Enhanced Data rates for GSM Evolution |
| EEROM | Electrically Erasable Read Only Memory |
| EPROM | Erasable Programmable Read-Only Memory |
| FM | Frequency Modulation |
| FPGA | Field Programmable Gate Array |
| FTP | File Transfer Protocol |
| GPRS | General packet radio service |
| GPS | Global Positioning System |

-continued

| Term | Definition |
| --- | --- |
| GSM | Global System for Mobile communications |
| HDL | Hardware Description Language |
| HTTP | Hyper-Text Transport Protocol |
| IEEE | Institution of Electrical Engineers |
| IM | Instant Messaging |
| IP | Internet Protocol |
| LAN | Local Area Network |
| MAC | Media Access Control |
| PC | Personal Computer |
| PCI | Peripheral Component Interconnect |
| PDA | Personal digital assistant |
| PNA | Personal Navigation Assistant |
| RAM | Random Access Memory |
| RAT | Radio Access Technology |
| RF | Radio Frequency |
| ROM | Read Only Memory |
| RSSI | Received Signal Strength Indicator |
| RUIM | Re-Usable Identification Module |
| SDIO | Secure Digital Input/Output |
| SIM | Subscriber Identity Module |
| SPI | Serial peripheral interconnect |
| SSID | Service Set Identifier |
| TCP | Transport Control Protocol |
| UI | User Interface |
| URL | Uniform Resource Locator |
| USB | Universal Serial Bus |
| UWB | Ultra-Wideband |
| WAN | Wide Area Network |
| WAP | Wireless Application Protocol |
| WEP | Wired Equivalent Protocol |
| WLAN | Wireless Local Area Network |

DETAILED DESCRIPTION

A novel and useful system and method of reducing the power consumption and limiting battery drain of a mobile communications device is provided. The power reduction mechanism is operative to detect the use of a wrong WEP encryption key in the establishment of a WLAN connection between the mobile device and an access point for both static and dynamic IP WLAN profiles. In addition, the power reduction mechanism is operative to detect the failure of the mobile device to acquire an IP address for both static and dynamic IP WLAN profiles. In response, the mobile device takes one or more power conserving actions, such as, (1) disabling the corresponding WLAN profile from future scanning; (2) dis-associating the WLAN radio from the AP and adding the AP to a 'ban' list; and (3) notifying the user through the user interface.

To aid in illustrating the embodiments of the power reduction mechanism, the various embodiments described infra are described in the context of an example communication system including a mobile communications device that implements IEEE 802.11-based wireless networking standards. It is appreciated, however, that those of ordinary skill in the art, using the teachings provided herein, can implement the disclosed techniques using other wireless standards and networks without departing from the scope of the mechanism. Accordingly, references to techniques and components specific to IEEE 802.11 apply also to the equivalent techniques or components in other wireless network standards unless otherwise noted.

Note that some aspects of the mechanism described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

Several advantages of the power reduction mechanism include: (1) conserving mobile device battery drain by preventing unnecessary power consumption due to continuous frame retries (e.g., DHCP Requests, ARP Requests, TCP retransmissions, etc.) for which the device neither gets a response nor an error code because the AP simply discards undecryptable frames from stations after acknowledging them; (2) improving the user experience by preventing serious connectivity errors that result from the mobile device associating and authenticating with an AP using the wrong WEP key; (3) provides a self-healing mechanism by which the device auto-recovers from temporary WEP key problems (including incorrect configuration of AP WEP encryption key); and (4) provides the user with information about the problem and asks for user input to correct it.

As will be appreciated by one skilled in the art, the power reduction mechanism may be embodied as a system, method, computer program product or any combination thereof. Accordingly, the power reduction mechanism may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the power reduction mechanism may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the power reduction mechanism may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The power reduction mechanism is described below with reference to flowchart illustrations and/or block diagrams of methods, apparatus (systems) and computer program products according to embodiments thereof. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is noted that computer programs implementing the power reduction mechanism can be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this mechanism. All these operations are well-known to those skilled in the art of computer systems.

The flowchart and block diagrams in the Figures illustrate the architecture, functionality, and operation of possible implementations of systems, methods and computer program products according to various embodiments of the power reduction mechanism. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Mobile Communications Device Embodiment

Figure 2:
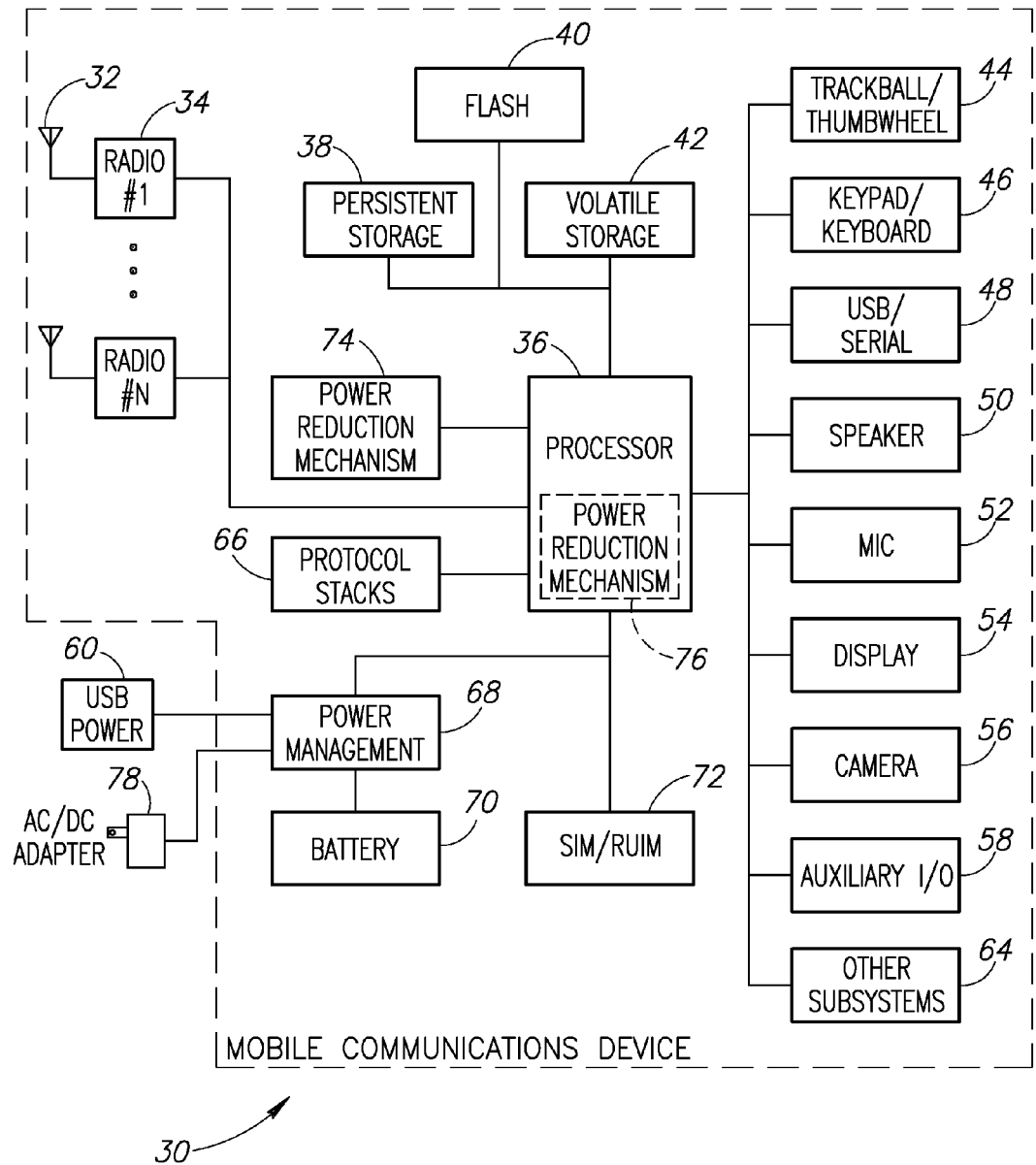
FIG. 2 is a block diagram illustrating an example wireless communication device incorporating the power reduction mechanism.

A block diagram illustrating an example mobile communication device incorporating the power reduction mechanism is shown in FIG. 2. The mobile communication device is preferably a two-way communication device having voice and data communication capabilities. In addition, the device optionally has the capability to communicate with other computer systems via the Internet. Note that the mobile communications device (or mobile device) may comprise any suitable wired or wireless device such as multimedia player, mobile communication device, cellular phone, smartphone, PDA, PNA, Bluetooth device, etc. For illustration purposes only, the device is shown as a mobile device, such as a cellular based smartphone. Note that this example is not intended to limit the scope of the mechanism as the power reduction mechanism can be implemented in a wide variety of communication devices. It is further appreciated the mobile device 30 shown is intentionally simplified to illustrate only certain components, as the mobile device may comprise other components and subsystems 64 beyond those shown.

The mobile device, generally referenced 30, comprises a processor 36 which may comprise a baseband processor, CPU, microprocessor, DSP, etc., optionally having both analog and digital portions. The mobile device may comprise a plurality of radios 34 and associated antennas 32. Radios for the basic cellular link and any number of other wireless standards and Radio Access Technologies (RATs) may be included. Examples include, but are not limited to, Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc. The mobile device also comprises protocol stacks 66, which may or may not be entirely or partially implemented in the processor 36. The protocol stacks implemented will depend on the particular wireless protocols required.

The mobile device may also comprise internal volatile storage 42 (e.g., RAM) and persistence storage 38 (e.g., ROM) and flash memory 40. Persistent storage 38 also stores applications executable by processor 36 including the related data files used by those applications to allow device 30 to perform its intended functions. Several user-interface devices include trackball/thumbwheel 44 which may comprise a depressible thumbwheel/trackball that is used for navigation, selection of menu choices and confirmation of action, keypad/keyboard 46 such as arranged in QWERTY fashion for entering alphanumeric data and a numeric keypad for entering dialing digits and for other controls and inputs (the keyboard may also contain symbol, function and command keys such as a phone send/end key, a menu key and an escape key), microphone(s) 52, speaker(s) 50 and associated audio codec or other multimedia codecs, vibrator (not shown) for alerting a user, camera and related circuitry 56, display(s) 54 and associated display controller. A serial/USB or other interface connection 48 (e.g., SPI, SDIO, PCI, USD, etc.) provides a serial link to a user's PC or other device. SIM/RUIM card 72 provides the interface to a user's SIM or RUIM card for storing user data such as address book entries, user identification, etc.

Portable power is provided by the battery 70 coupled to power management circuitry 68. External power is provided via USB power 60 or an AC/DC adapter 78 connected to the power management circuitry 68 which is operative to manage the charging and discharging of the battery 70.

The mobile communications device is also adapted to implement the power reduction mechanism 74. Alternatively (or in addition to), the power reduction mechanism may be implemented as a task 74 stored in external memory executed by the processor 36 or may be implemented as a task 76 executed from memory embedded in processor 36. The power reduction task blocks 74, 76 are adapted to implement the power reduction mechanism as described in more detail infra. Note that the power reduction mechanism may be implemented as hardware, software or as a combination of hardware and software. Implemented as a software task, the program code operative to implement the power reduction mechanism is stored in one or more memories 38, 40, 42 or local memories within the processor 36.

Power Reduction Mechanism

In prior art WLAN systems, a problem occurs when a WLAN capable device uses an open system profile to connect to an AP that is also configured with an open system profile which has the same SSID as the profile saved on the device but uses a different WEP key for encryption. Assuming an open system profile, in this scenario, the device will be able to successfully complete association and authentication with no issues. The device, however, will be unable to either successfully send or receive packets to or from the AP since the device uses a different WEP encryption key than the one the AP uses. The device, configured with the wrong WEP key, repeatedly attempts to send packets to the AP resulting in significant device battery drain.

In the case that the device is using WEP but is configured with the wrong WEP key, the device is able to associate but will not be able to decrypt any packets. In this case, the device will keep on retrying frames (e.g. DHCP requests, ARP requests, etc.) which will cause the battery to drain.

A problem also arises in the case where the mobile device communicates with an AP that it cannot acquire an IP address through or cannot exchange traffic with. Moreover, if the mobile device is disconnected later by the AP due to inactivity, prior art algorithms repeatedly scan and associate using the same WLAN profile as long as the AP has the highest preference or highest RSSI value. This exacerbates the problem and causes severe device battery drain.

Thus, to minimize or eliminate the battery draining effects of using an incorrect WEP key, the power reduction mechanism is operative to monitor the communications exchange process at the mobile device (also referred to as handset, WLAN client, client, mobile communications device, handheld or device) that takes place between the mobile device and the access point (i.e., the WLAN) in both the (1) uplink (e.g., multicast and broadcast frames from stations that the AP does not redirect back to the BSS due to its inability to decrypt them) and (2) downlink directions (e.g., WEP decryption error data frames). The term 'communications exchange' refers to either (1) authentication related frames related to shared key authentication (authentication frames exchange); and (2) DHCP packets sent as data frames during the IP address acquisition process. The mechanism is described both for the case of a WLAN profile configured with a static IP address and for the case there the WLAN profile is configured with a dynamic IP address.

WLAN Profile with Static IP Address

As described supra, in the event of a WEP key mismatch between the mobile device and the AP, in the case of open system authentication with a static IP address where no authentication is required, the mismatch is not detected until one side attempts to transmit data frames to the other side. In this case, absent the power reduction mechanism, the mobile device would repeatedly attempt to transmit data frames encrypted with the wrong WEP key. The AP would receive the frames but fail to properly decrypt them and drop them as a result thus causing the device battery to drain. In the case of shared key authentication, an incorrect WEP key is detected in the event authentication fails.

Figure 3:
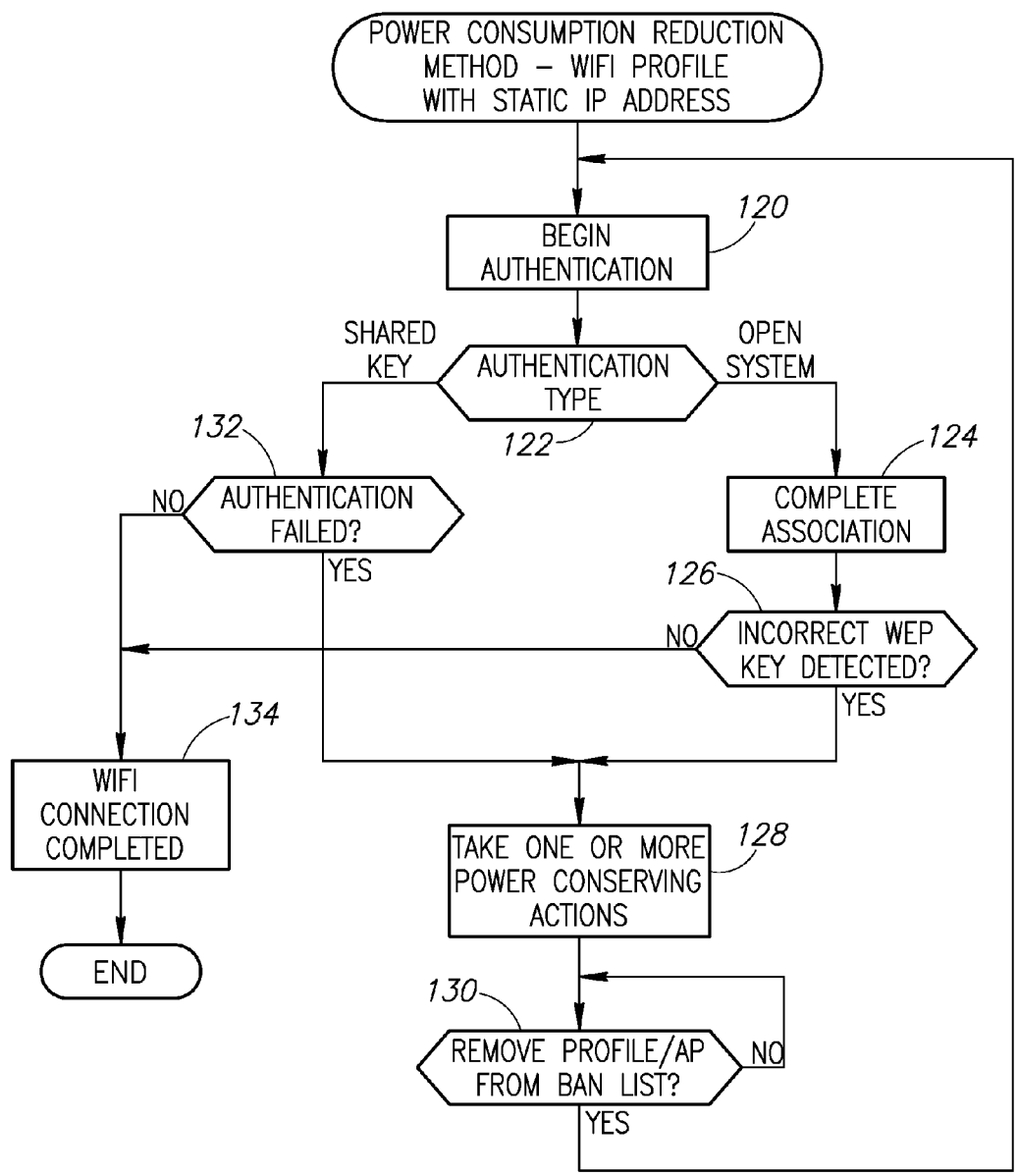
FIG. 3 is a flow diagram illustrating an example of the power consumption reduction method for a WLAN profile having a static IP address.
Figure 4:
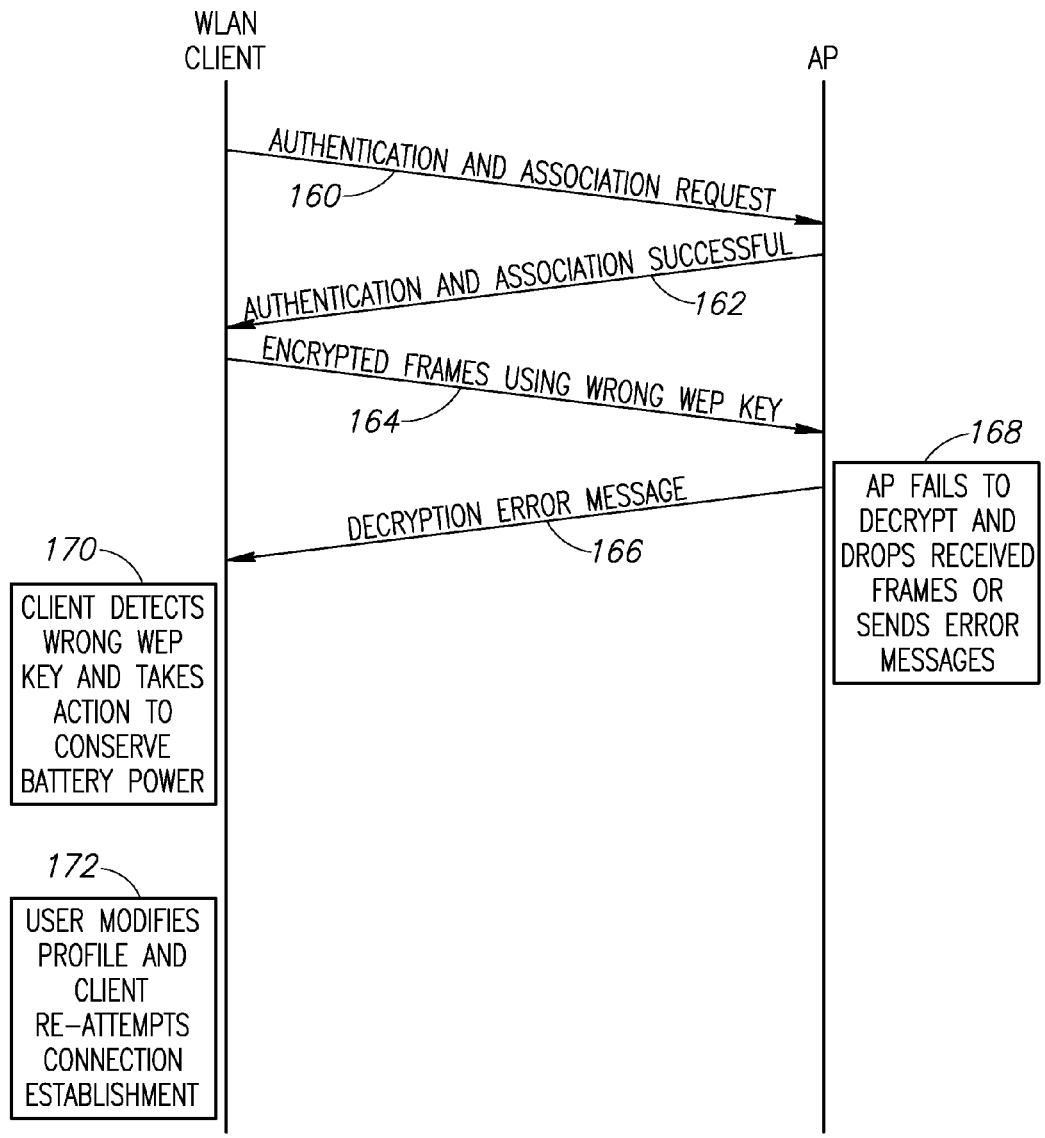
FIG. 4 is a timing diagram illustrating the event sequence for open system authentication with static IP address.

A flow diagram illustrating an example of the power consumption reduction method for a WLAN profile having a static IP address is shown in FIG. 3. A timing diagram illustrating the event sequence for open system authentication with static IP address is shown in FIG. 4. With reference to FIGS. 3 and 4, initially, the mobile device performs the authentication process with the AP in accordance with the WLAN profile (step 120), (event 160). If the authentication type is open system (step 122), then essentially no authentication is required and the mobile device completes the association process (step 124), (event 162). The mobile device sends encrypted frames to the AP (event 164). In this case, the AP will fail to properly decrypt the frames and drop the frame and/or send an error message (block 168). If an incorrect WEP key is detected such as via a decryption error message (event 166), (step 126), then the mobile device takes one or more power conserving actions (step 128), (block 170).

The actions that can be taken include, but are not limited to, any one or more of the following in any combination:
1. Add the AP and/or profile to a ban list.
2. An AP/profile already on a ban list is attempted for WLAN association at intervals longer than that for a normal i.e. non banned AP/profile.
3. An AP/profile already on the ban list is skipped from active scanning and from association attempts for a duration defined by a timer to conserve power. Active scanning and association are re-enabled for that AP/profile after the timer expires.
4. An AP/profile already on the ban list is skipped from active scanning and from association attempts for a duration defined by a timer to conserve power. Active scanning and association are re-enabled for that AP/profile after the user has edited the corresponding profile settings (e.g., WEP key) or upon any of the other criteria described herein (e.g., the radio is cycled or the device goes out of the range of the banned AP/profile).

5. The scan results for an AP/profile on the ban list are filtered out and not used for attempting association establishment.
6. The user is notified through the user interface and/or external entities, systems, control units, etc. are notified as well.
7. The banned AP/profile is flagged with a special mark in any user interface (e.g., font, color, symbol, etc.) to indicate it is on a ban list.

The effect of the one or more power conserving actions described above is that the mobile device is prevented from continuously sending packets that will not be decrypted correctly by the AP thus saving device battery life.

Note that a distinction is made between a connectivity scan that the device performs as long as the radio is on and the device is not connected. The purpose of the connectivity scan is to find a WLAN network/AP to connect to (without user intervention). In contrast, a discovery scan is user initiated and serves to find all available networks. A banned profile/AP is skipped from active "connectivity scans" and any scan results found during passive scans are also filtered out if they belong to a banned AP/SSID. If a user requested a discovery scan, however, the device scans for the SSID/AP (both passively and actively) and, in one embodiment, reports the scan results for any banned entities in a special color, mark, or any suitable user interface method to indicate it is banned. Only when the user requests a connection to this AP/profile, is the entity un-banned. In other words, all SSIDs/BSSIDs are temporarily un-banned during a user initiated discovery scan to allow for active scans to these entities; and they are completely un-banned when the user requests a connection to the particular SSID/BSSID.

Figure 9:
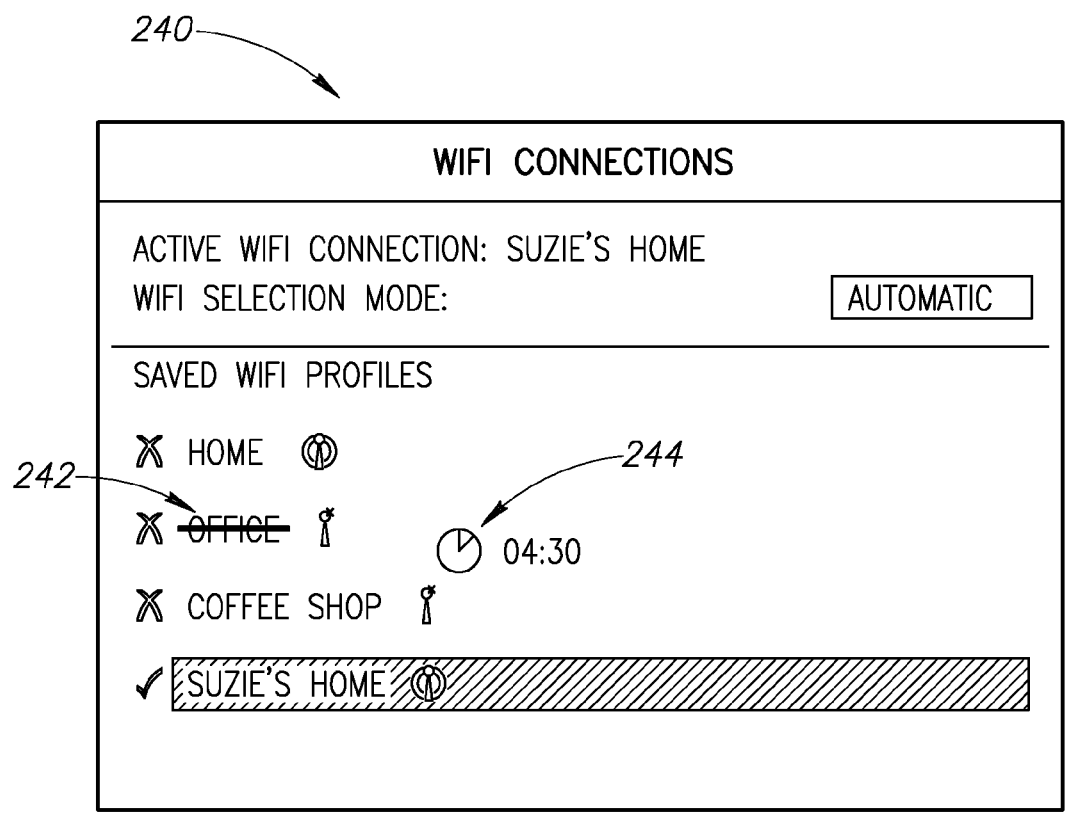
FIG. 9 is a diagram illustrating an example screenshot in a mobile phone listing connection profiles stored in a mobile station including a temporarily banned connection profile.

When displayed as part of a list of connection profiles stored in the station, any banned connection profiles may optionally have their banned status indicated by a visual indication, in accordance with bullets 6 and 7 above. A diagram illustrating an example screenshot in a mobile phone is shown in FIG. 9. The screenshot, generally referenced 240, lists connection profiles stored in a mobile station, for example, station 242, in which a temporarily banned connection profile, labeled "Office", is identified by a visual indication, which in this example is a strike-out line through the label. Alternatively or additionally, a visual indication 244 is used to identify the temporarily banned connection profile, where the visual indication comprises a timer showing how much time (in minutes and seconds) is left before the profile labeled "Office" is un-banned. Optionally, the time indication may show (instead of or in addition to) show how long the profile labeled "Office" has been banned.

Figure 10A:
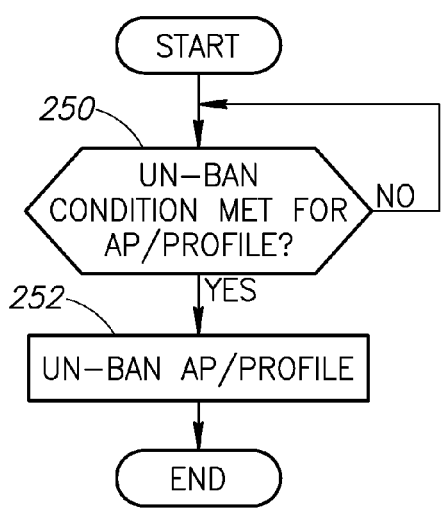
FIGS. 10A, 10B 10C and 10D are flow diagrams illustrating example methods of removing a profile from a ban list.

Note that the power conserving actions taken by the mobile device may be on either a permanent or temporary basis. The AP/profile previously placed on the ban list can be removed therefrom in one or several ways as described herein. Flow diagrams illustrating example methods of removing an AP/profile from a ban list are illustrating in FIGS. 10A, 10B 10C and 10D. With reference to FIG. 10A, if it is detected that an un-banned condition is met for an AP/profile that was previously banned (step 250), the banned AP/profile is un-banned (step 130 FIG. 3; step 252 FIG. 10D). Note that different conditions or different combinations of conditions may be used in different implementations.

Figure 10B:
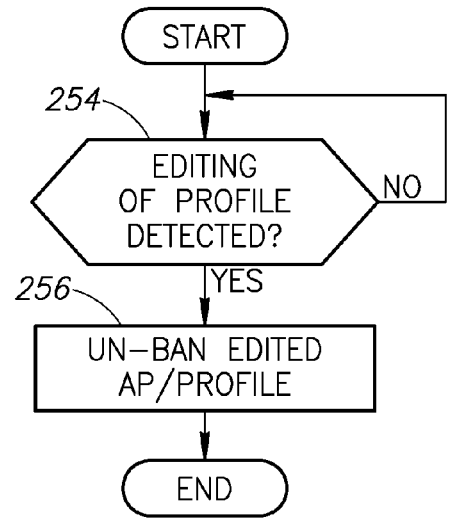

With reference to FIG. 10B, if notification is received that the user edited the WEP encryption key saved for the previously banned AP/profile indicating that the incorrect WEP key may have been corrected by the user (block 172 FIG. 4) (step 254), then a station un-bans the previously banned AP/profile (step 256).

Figure 10C:
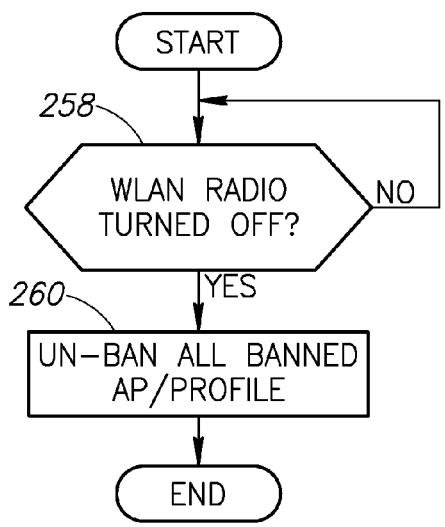
Figure 10D:
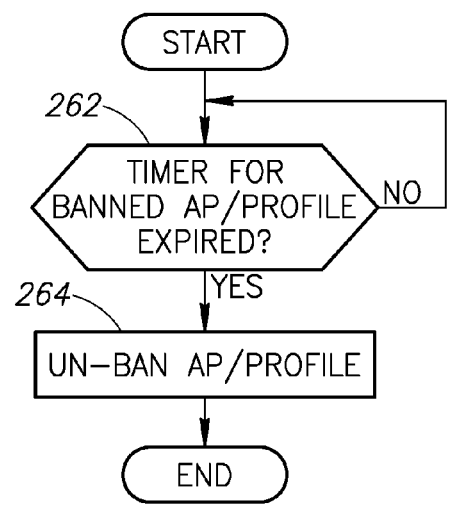

With reference to FIG. 10C, if the station detects that the WLAN radio has been turned off (or on) (step 258), the station then un-bans all banned AP/profiles (step 260). With reference to FIG. 10D, if the station detects that the timer for a previously banned AP/profile expired (the mobile device uses a timer to measure the duration the AP stays on the ban list) the AP/profile is removed from the ban list (i.e. the profile is un-banned, re-enabled, association and active scanning resume, etc.) and connection establishment is re-attempted, thus allowing for recovering from network side problems (step 262).

Other ways a previously banned AP/profile can be removed from the ban list include (1) if the user initiates the profile scan/association manually; (2) the mobile device gets out of coverage of the specifically banned AP/SSID (i.e. it is no longer found in the scan results); or if the user requests a discovery scan and requests a connection to one of the AP/profile scan results.

Note that banning a connection profile may be implemented in the station using suitable mechanism. For example, a connection profile may include a field which is set to a first value if the connection profile is not banned and set to a second value if the connection profile is banned. In another example, an indication of the connection profile, such as its network name, may be added to a list when the connection profile is banned, and may be removed from the list when the connection profile is un-banned.

Note that banning an access point may be implemented in the station in any suitable manner. For example, a unique identifier of the access point, such as its MAC address, may be added to a ban list when the access point is banned, and may be removed from the ban list when the access point is unbanned.

Figure 11A:
FIGS. 11A, 11B and 11C are diagrams illustrating example screenshots displayed at a mobile station.
Figure 11B:
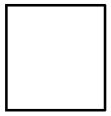
Figure 11C:

Diagrams illustrating example screenshots displayed at a mobile station, for example, mobile device station 12 (FIG. 1) are shown in FIGS. 11A, 11B and 11C. FIG. 11A illustrates a screenshot for selection of a security type to be saved in a particular connection protocol. FIG. 11B illustrates a screenshot displayed when the station is attempting to connect to a WLAN with the network name "Rosencrantz". FIG. 11C illustrates a screenshot displayed when either (1) authentication failed because credentials supplied by the mobile station to the target access point for the authentication process do not match expected credentials (in the case of shared key authentication); or (2) if the association process completed successfully but an incorrect WEP key is detected (in the case of open system authentication).

Note that in one embodiment, a signal is generated from the user interface module indicating that the WEP key of the profile has been modified by the user which enables the scan for that profile. The mobile device, if still not associated, re-attempts to connect to the AP using the same profile and encrypt/decrypt data packets using the new key. If new key matches the one used by the AP, the connection is maintained, otherwise, the device de-authenticates itself from the AP and the same process is repeated to conserve device battery power.

In one embodiment, if an incorrect WEP key is repeatedly detected, the length of time the AP/profile is placed on the ban list changes dynamically, e.g., increases at some rate. This can be performed, e.g., by setting the backoff counter for the scan algorithm. For example, the first time an incorrect WEP key is detected, the AP/profile may be placed on the ban list for 3-5 minutes. The second time an incorrect WEP key is detected, the same AP/profile may be placed on the ban list for 10 minutes, and so on. This results in additional power savings since as the number of times an incorrect WEP key is detected, it is more and more likely that the incorrect WEP configured in the profile is not going to be changed. Thus, the time interval between attempts at re-establishing the connection may increase thus conserving even more power.

There are several ways in which an incorrect WEP key may be detected. First, an incorrect WEP key may be detected by receipt of an error code from the AP indicating that an uplink frame sent from the mobile device is not able to be decrypted. Second, an incorrect WEP key may be detected if the mobile device is unable to decrypt downlink frames from the AP. Note that the frame may comprise a unicast, multicast or broadcast frame. Third, an incorrect WEP key may be detected when the mobile device sends a multicast or broadcast frame (e.g., DHCP DISCOVER, ARP or RARP) but no corresponding echo frame is received from the AP, indicating that the AP and mobile device have a WEP key mismatch. Fourth, monitoring repetitive unacknowledged TCP retransmissions, ARP requests, etc. whereby the user is notified of the number of failures within the past time window (e.g., ARP_Attempts/ARP_Failures) and is prompted for an action (e.g., correct the WEP key, flag the profile for backoff or permanently block the profile until the problem is corrected). For example, a 100% failure/timeout rate of Ping packets sent by the device (e.g., to the DNS server since the device might not have the IP address of the AP in an enterprise scenario). Such counters can be presented to the user via the user interface to indicate a potential WEP key mismatch problem. Note that depending on the scenario, detection of an incorrect WEP key may require a combination of two or more of the detection techniques described above to confirm that a WEP key is incorrect.

Figure 5:
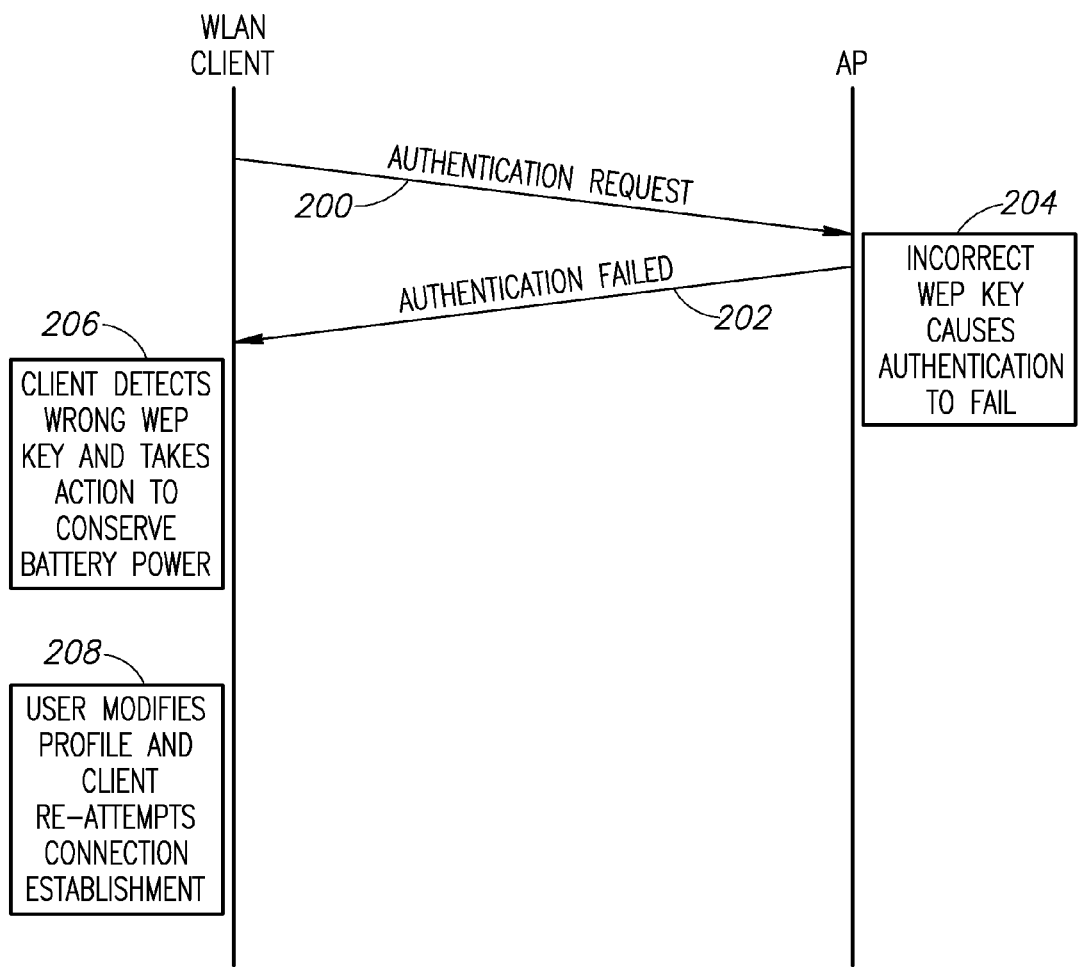
FIG. 5 is a timing diagram illustrating the event sequence for shared key authentication with static IP address.

A timing diagram illustrating the event sequence for shared key authentication with static IP address is shown in FIG. 5. With reference to FIGS. 3 and 5, if the authentication type is shared key (step 122), then authentication with the WEP key configured is attempted (event 200). If authentication is successful (step 132), the WLAN connection is complete and data transfer begins (step 134). If authentication fails (step 132), (event 202), it is assumed that an incorrect WEP key is the cause since the mobile device will fail the security challenge presented by the AP (block 204). In response, the mobile device takes one or more power conserving actions (step 128), (block 206), i.e. the corresponding profile is disabled and related association attempt and active scanning cease, the AP is added to the ban list and the user is notified. If the AP is placed on the ban list temporarily, a timer is started. Upon expiration of the timer or if the profile is edited (i.e. different WEP key entered) (step 130), (block 208), the connection establishment is re-attempted (i.e., the method continues with step 120). Note that in the case of shared key authentication, detection of an incorrect WEP key is relatively straightforward.

WLAN Profile with Dynamic IP Address

If the WLAN profile is configured with the incorrect WEP key, in the case of open system authentication with dynamic IP, the DHCP request process will not be successful because the AP will not be able to decrypt the DHCP DISCOVER packet sent by/from the mobile device. As a result, the mobile device is unable to obtain an IP address and connection establishment fails. Note that DHCP failures may also be caused by other factors such as frame collisions, network congestion, dropped frames, etc. and are not limited to use of the incorrect WEP key. In both cases, absent the power reduction mechanism, the mobile device would otherwise repeat the cycle of scanning, association/authentication attempts and DHCP request failures, resulting in device battery drain. Thus, although the mobile device manages to complete authentication, the wrong WEP key is used for communication with the AP and, as a result, (1) the mobile device receives frames from the AP but will not be able to decrypt them; or (2) the AP will not be able to decrypt frames from the mobile device and as a result discards them without sending an error code.

Figure 6:
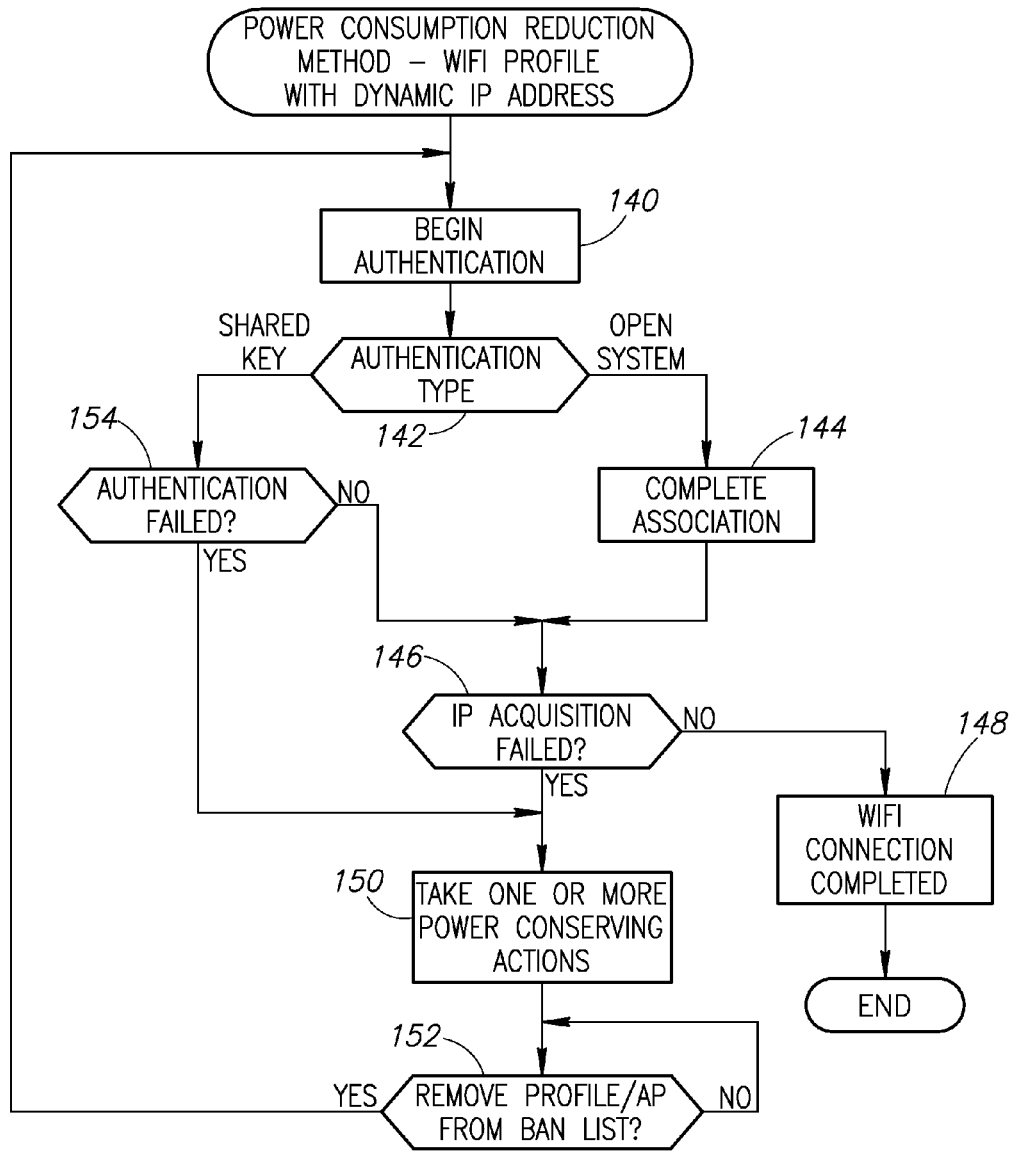
FIG. 6 is a flow diagram illustrating an example of the power consumption reduction method for a WLAN profile having a dynamic IP address.
Figure 7:
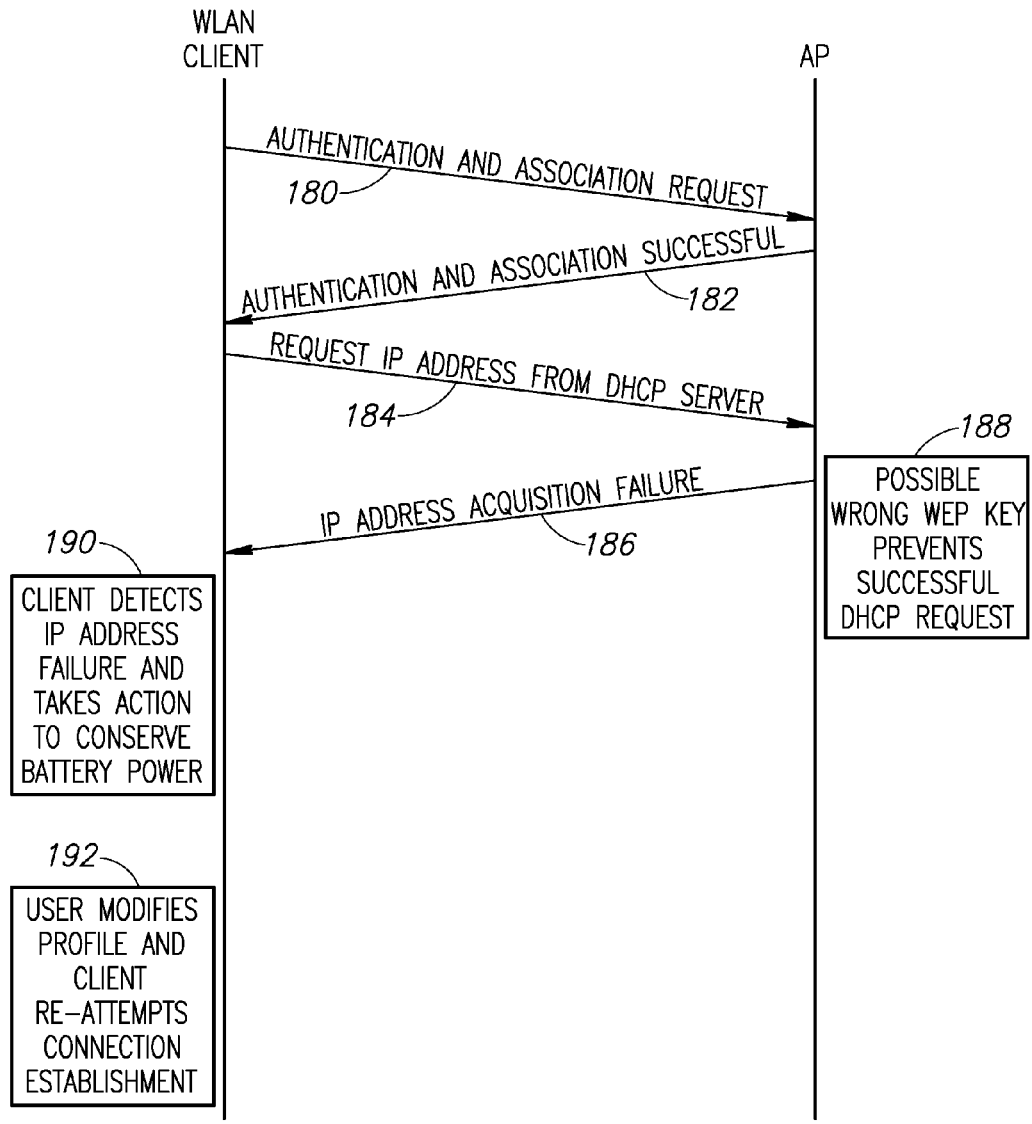
FIG. 7 is a timing diagram illustrating the event sequence for open system authentication with dynamic IP address.

A flow diagram illustrating an example of the power consumption reduction method for a WLAN profile having a dynamic IP address is shown in FIG. 6. A timing diagram illustrating the event sequence for open system authentication with dynamic IP address is shown in FIG. 7. With reference to FIGS. 6 and 7, initially, the mobile device performs the authentication process with the AP in accordance with the WLAN profile (step 140), (event 180). If the authentication type is open system (step 142), then essentially no authentication is required and the mobile device completes the association process (step 144), (event 182). The mobile device attempts to acquire an IP address from the DHCP server (event 184). If IP address acquisition is successful (step 146), the WLAN connection is completed and communication between the mobile device and the AP begins (step 148).

An incorrect WEP key, however, will prevent the successful acquisition of an IP address (block 188). If IP address acquisition fails (step 146), (event 186), the mobile device takes one or more power conservation actions (step 150), (block 190).

As in the static IP case, the actions that can be taken include, but are not limited to, any one or more of the following in any combination:

1. Add the AP and/or profile to a ban list.
2. An AP/profile already on a ban list is attempted for WLAN association at intervals longer than that for a normal, i.e. non banned, AP/profile.
3. An AP/profile already on the ban list is skipped from active scanning and from association attempts for a duration defined by a timer to conserve power. Active scanning and association are re-enabled for that AP/profile after the timer expires.
4. An AP/profile already on the ban list is skipped from active scanning and from association attempts for a duration defined by a timer to conserve power. Active scanning and association are re-enabled for that AP/profile after the user has edited the corresponding profile settings (e.g., WEP key) or upon any of the other criteria described herein (e.g., the radio is cycled or the device goes out of the range of the banned AP/profile).
5. The scan results for an AP/profile on the ban list are filtered out and not used for attempting association establishment.
6. The user is notified through the user interface and/or external entities, systems, control units, etc. are notified as well.
7. The banned AP/profile is flagged in any user interface with a special mark (e.g., font, color, symbol, etc.) to indicate it is on a ban list.

The effect of the one or more power conserving actions described above is that the mobile device is prevented from continuously sending packets that will not be decrypted correctly by the AP thus saving device battery life.

An example screenshot of a listing of connection profiles stored in a mobile station in which temporarily banned connection profiles are identified by a visual indication is shown in FIG. 9, described supra.

As in the static IP case, the power conserving actions taken by the mobile device may be on either a permanent or temporary basis. The AP/profile previously placed on the ban list can be removed therefrom in one or several ways as described supra in connection with FIGS. 10A, 10B, 10C and 10D.

As described supra, banning an access point may be implemented in the station in any suitable manner. For example, a unique identifier of the access point, such as its MAC address, may be added to a ban list when the access point is banned, and may be removed from the ban list when the access point is un-banned.

Diagrams illustrating example screenshots displayed at a mobile station, for example, mobile device station 12 (FIG. 1) are shown in FIGS. 11A, 11B and 11C, as described supra.

As in the static IP case, the time duration that the mobile device is placed on the ban list can vary dynamically, e.g., increases with repeated failures, thereby increasing the amount of power saved.

Figure 8:
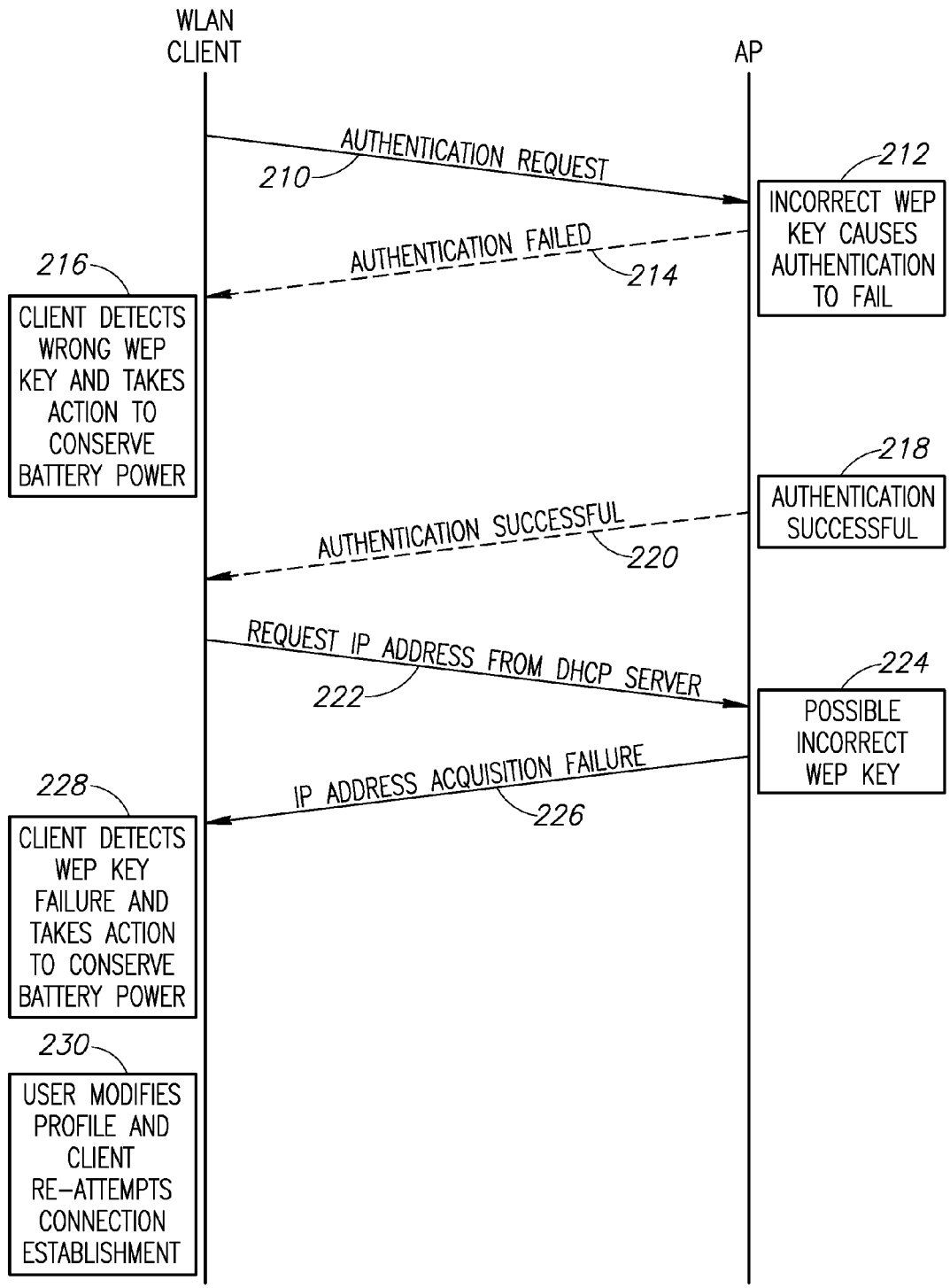
FIG. 8 is a timing diagram illustrating the event sequence for shared key authentication with dynamic IP address.

A timing diagram illustrating the event sequence for shared key authentication with dynamic IP address is shown in FIG. 8. With reference to FIGS. 6 and 8, if the authentication type is shared key (step 142), then authentication with the WEP key configured is attempted (event 210). If authentication fails (step 154), (event 214), it is likely caused by use of an incorrect WEP key (block 212) and power conserving actions are taken (i.e., the method continues with steps 150 and 152).

If authentication is successful (step 154), (event 220), then the mobile device attempts to acquire an IP address from the DHCP server (event 222). If IP address acquisition fails (step 146), power conserving actions are taken by the mobile device (i.e., the method continues with steps 150 and 152). Note that although authentication may be successful (i.e., correct WEP key), IP address acquisition may fail for a number of reasons, e.g., incorrect IP address, DHCP server error, etc. In this case, despite use of a correct WEP key, it is desirable to take the same battery power conserving actions.

Note that there are several ways in which in can be determined that the IP address acquisition process has failed and/or use of an incorrect WEP key. In either case, the same action is taken. First, if the mobile device receives downlink traffic from the AP, it monitors decryption errors. Second, the mobile device broadcasts frames and looks for re-broadcast of the frames from the AP back to the BSS (assuming the AP is able to decrypt the frame received from the mobile device). Third, the detection of occurrences of continuous DHCP failures and the inability to obtain an IP address. For example, the counters DHCP_Attempts which counts the number of DHCP requests and DHCP_Failures which counts the number of IP acquisition failures are presented to the user via the user interface to indicate a potential WEP key mismatch problem. Note that in alternative embodiments, detection may require a combination of two or more of the detection techniques described above for satisfactory confirmation.

Note that the power reduction mechanism described supra is applicable to both Independent BSSs and infrastructure BSSs. In the case of an independent BSS, the AP refers to a regular access point (infrastructure mode) and/or a client acting as an access point (as in the case with Independent BSS).

In an alternative embodiment, assuming a means of detecting the existence of a Small Office/Home Office (SOHO) AP or an Enterprise AP, the power reduction mechanism is operative to block the SSID (i.e. the profile) for enterprise APs and block the BSSIDs for SOHO APs.

Figure 12:
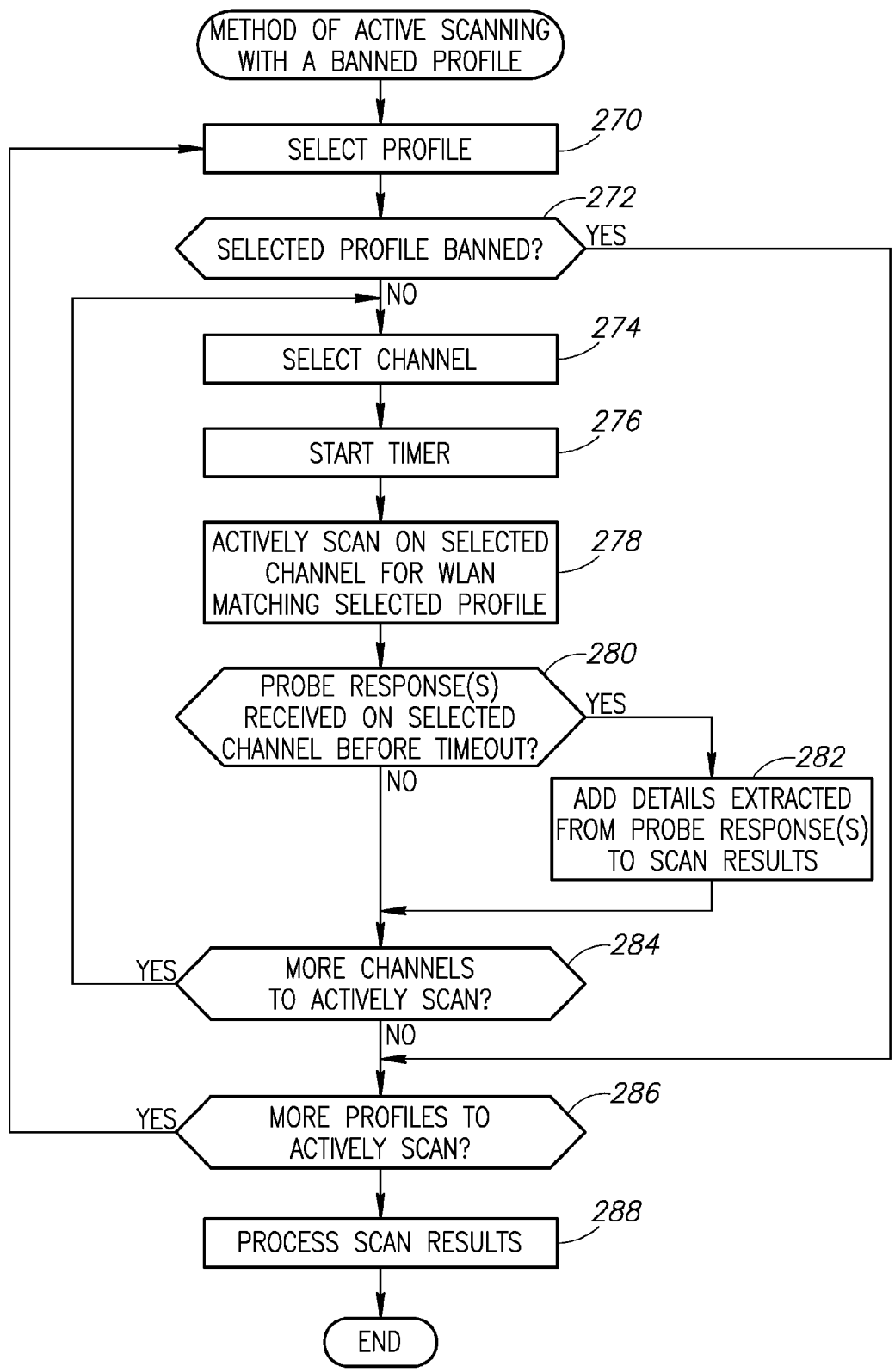
FIG. 12 is a flow diagram illustrating an example method for active scanning that takes into account whether a profile is banned.

It is noted that banning a connection profile affects how subsequent scans and connection attempts are handled. A flow diagram illustrating an example method for active scanning that takes into account whether a profile is banned is shown in FIG. 12. The method is typically performed by a mobile device, such as station 12 (FIG. 1). As the method of FIG. 12 is an example, other methods of active scanning by the station are contemplated as is appreciated by one skilled in the art.

The station first selects a connection profile, for example, from among the connection profiles stored in its memory (step 270). The station then determines whether the selected connection profile is banned, for example, by sampling the value of the field of the profile or by checking whether the selected connection profile is included in the list (step 272).

If the selected connection profile is not banned, the station proceeds to select a channel upon which to do the active scanning (step 274). The station then starts a timer (step 276) and the station actively scans on the selected channel for a WLAN having the same network name as that of the selected connection profile (step 278). This typically involves the station transmitting a probe request specifying the network name of the selected connection profile on the selected channel. The station then waits to see if any probe responses are received on the selected channel before the timer expires (step 280). Only APs configured with the network name specified in the probe request and configured to operate on the selected channel will respond to the probe request with a probe response.

If the station has received one or more probe responses on the selected channel before the expiration of the timer (step 280), the station adds to the scan results one or more records containing details extracted from the received one or more probe responses (step 282) and then proceeds to check whether there are any other channels to actively scan (step 284). If so, the method proceeds to step 274 where the station selects another channel. If there are no additional channels to actively scan (step 284), the station checks whether any other connection profiles are to be actively scanned (step 286).

If there is at least one more connection profile to be actively scanned, the method continues to step 270 where the station selects another connection profile. If there are no other connection profiles to be actively scanned, then the station processes the scan results of the active scanning (step 288).

For example, processing the scan results may include automatically selecting a target AP from the scan results without user intervention. In another example, processing the scan results may include displaying, via a display of the station, a list of available networks learned from the scan results, so that a user of the station can select a target AP from the displayed list.

If no probe responses have been received by the station before the timeout (step 280), the station then proceeds directly to check whether there are any other channels to actively scan (step 284). If the selected profile is banned (step 272), the station checks whether any other connection profiles are to be actively scanned (step 286).

Figure 13:
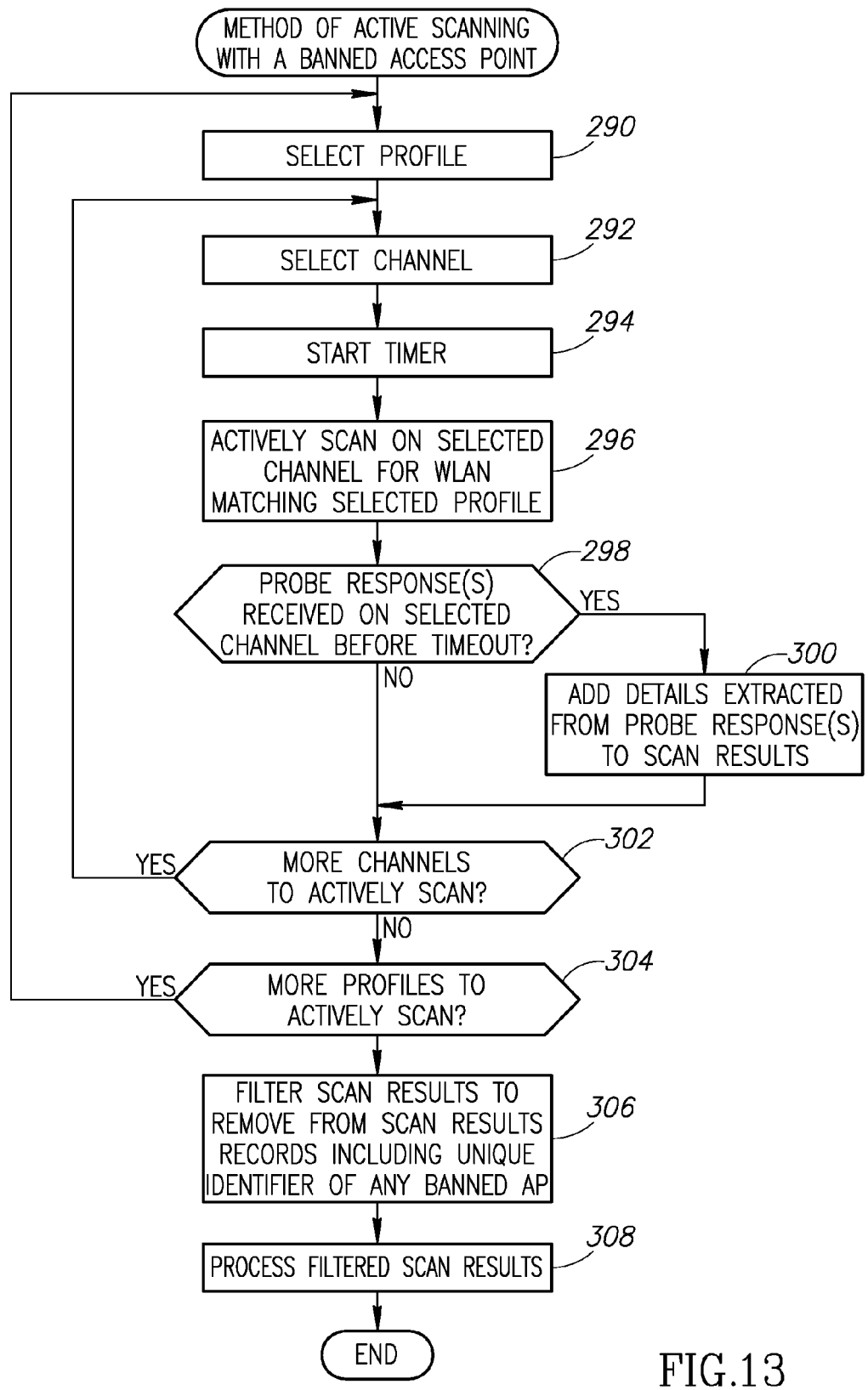
FIG. 13 is a flow diagram illustrating an example method for active scanning that takes into account whether an access point is banned.

Similar to a banned connection profile, banning an access point affects how subsequent scans and connection attempts are handled. A flow diagram illustrating an example method for active scanning that takes into account whether a profile is banned is shown in FIG. 13. The method is typically performed by a mobile device, such as station 12 (FIG. 1). As the method of FIG. 13 is an example, other methods of active scanning by the station are contemplated as is appreciated by one skilled in the art.

First, the station selects a connection profile, for example, from among the connection profiles stored in its memory (step 290). The station then selects a channel upon which to do the active scanning (step 292). The station then starts a timer (step 294), and the station then actively scans on the selected channel for a WLAN having the same network name as that of the selected connection profile (step 296). This typically involves the station transmitting a probe request specifying the network name of the selected connection profile on the selected channel. The station then waits to see if any probe responses are received on the selected channel before the timer expires. Only APs configured with the network name specified in the probe request and configured to operate on the selected channel will respond to the probe request with a probe response.

If the station received one or more probe responses on the selected channel before the timer expires (step 298), the station adds to the scan results one or more records containing details extracted from the received one or more probe responses (step 300), and then proceeds to check whether there are any other channels to actively scan (step 302). If so, the method proceeds to step 292 where the station selects another channel. If there are no additional channels to actively scan (step 302), the station checks whether any other connection profiles are to be actively scanned (step 304).

If there is at least one more connection profile to be actively scanned, the method continues to step 290 where the station selects another connection profile. If there are no other connection profiles to be actively scanned, then the station filters the scan results of the active scanning to remove from the scan results any records including the unique identifier of any banned AP (step 306). For example, if the station maintains a list of MAC addresses of banned APs, the station compares the MAC addresses in the records to the MAC addresses in the list. In a modified method for active scanning, the filtering to remove records including the unique identifier of any banned AP may occur during step 300, for the selected channel, instead of during step 306.

After filtering the scan results, the station processes the filtered scan results of the active scanning (step 308). For example, processing the filtered scan results may include automatically selecting a target AP from the filtered scan results without user intervention. In another example, processing the filtered scan results may include displaying, via a display of the station, a list of available networks learned from the filtered scan results, so that a user of the station can select a target AP from the displayed list.

If no probe responses have been received by the station before the timeout (step 298), the station then proceeds directly to check whether there are any other channels to actively scan (step 302).

The terminology used herein is for the purpose of describing particular embodiments only and is not intended to be limiting of the mechanism. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the mechanism has been presented for purposes of illustration and description, but is not intended to be exhaustive or limited to the mechanism in the form disclosed. As numerous modifications and changes will readily occur to those skilled in the art, it is intended that the mechanism not be limited to the limited number of embodiments described herein. Accordingly, it will be appreciated that all suitable variations, modifications and equivalents may be resorted to, falling within the spirit and scope of the mechanism. The embodiments were chosen and described in order to best explain the principles of the mechanism and the practical application, and to enable others of ordinary skill in the art to understand the mechanism for various embodiments with various modifications as are suited to the particular use contemplated.

It is intended that the appended claims cover all such features and advantages of the mechanism that fall within the spirit and scope of the mechanism. As numerous modifications and changes will readily occur to those skilled in the art, it is intended that the mechanism not be limited to the limited number of embodiments described herein. Accordingly, it will be appreciated that all suitable variations, modifications and equivalents may be resorted to, falling within the spirit and scope of the mechanism.

What is claimed is:

1. A method of reducing power consumption in a wireless communications device, the method comprising:
   storing a first wired equivalent privacy (WEP) key at the wireless communications device in connection with a profile, the profile indicating an open system security type and a network name;
   successfully authenticating and associating with an access point (AP), thus joining a wireless local area network (WLAN) supported by the AP, the WLAN having the network name, the WLAN supporting the open system security type, and the WLAN requiring a second WEP key for encryption;
   subsequent to joining the WLAN, conducting encrypted communications with the AP;
   detecting from the encrypted communications that there is a mismatch between the first WEP key and the second WEP key; and
   responsive to detecting the mismatch, banning the profile.

2. The method according to claim 1, wherein conducting encrypted communications with the AP comprises encrypting an uplink frame using the first WEP key and transmitting the encrypted uplink frame to the AP, and wherein detecting the mismatch comprises receiving an error code from the AP, the error code indicating that the AP is unable to decrypt the encrypted uplink frame.

3. The method according to claim 1, wherein conducting encrypted communications with the AP comprises encrypting an uplink frame using the first WEP key, the uplink frame including a multicast frame or a broadcast frame, and transmitting the encrypted uplink frame to the AP, and wherein detecting the mismatch comprises failing to receive from the AP an echo frame corresponding to the multicast frame or to the broadcast frame.

4. The method according to claim 1, wherein conducting encrypted communications with the AP comprises receiving an encrypted downlink frame from the AP, and wherein detecting the mismatch comprises failing to decrypt the encrypted downlink frame using the first WEP key.

5. The method according to claim 1, wherein conducting the encrypted communications with the AP and detecting the mismatch comprises, within a window of time, repeatedly: encrypting an uplink frame using the first WEP key, transmitting the encrypted uplink frame to the AP, and failing to receive acknowledgment of receipt of the uplink frame from the AP.

6. The method according to claim 5, wherein the uplink frame includes a dynamic host control protocol (DCHP) request.

7. The method according to claim 5, wherein the uplink frame includes an address resolution protocol (ARP) request.

8. The method according to claim 1, further comprising disassociating from the AP responsive to detecting the mismatch.

9. The method according to claim 1, further comprising generating a user notification responsive to detecting the mismatch.

10. A method of reducing power consumption in a wireless communications device, the method comprising:
- storing a first wired equivalent privacy (WEP) key at the wireless communications device in connection with a profile, the profile indicating an open system security type and a network name;
- successfully authenticating and associating with an access point (AP), thus joining a wireless local area network (WLAN) supported by the AP, the WLAN having the network name, the WLAN supporting the open system security type, and the WLAN requiring a second WEP key for encryption;
- subsequent to joining the WLAN, requesting an Internet Protocol (IP) address from a dynamic host control protocol (DHCP) server;
- responsive to requesting the IP address, receiving an indication of IP address acquisition failure; and
- responsive to receiving the indication of IP address acquisition failure, banning the profile.

11. A wireless communications device, comprising:
one or more radio circuits;
a memory;
a processor coupled to the one or more radio circuits and the memory, the processor operative to:
- store a first wired equivalent privacy (WEP) key at the wireless communications device in connection with a profile, the profile indicating an open system security type and a network name;
- successfully authenticate and associate with an access point (AP), thus joining a wireless local area network (WLAN) supported by the AP, the WLAN having the network name, the WLAN supporting the open system security type, and the WLAN requiring a second WEP key for encryption;
- subsequent to joining the WLAN, conduct encrypted communications with the AP;
- detect from the encrypted communications that there is a mismatch between the first WEP key and the second WEP key; and
- responsive to detecting the mismatch, ban the profile.

12. The wireless communications device according to claim 11, the processor operative to conduct the encrypted communications with the AP by encrypting an uplink frame using the first WEP key and transmitting the encrypted uplink frame to the AP, and the processor operative to detect the mismatch by receiving an error code from the AP, the error code indicating that the AP is unable to decrypt the encrypted uplink frame.

13. The wireless communications device according to claim 11, the processor operative to conduct the encrypted communications with the AP by encrypting an uplink frame using the first WEP key, the uplink frame including a multicast frame or a broadcast frame, and transmitting the encrypted uplink frame to the AP, and the processor operative to detect the mismatch by failing to receive from the AP an echo frame corresponding to the multicast frame or to the broadcast frame.

14. The wireless communications device according to claim 11, the processor operative to conduct the encrypted communications with the AP by receiving an encrypted downlink frame from the AP, and the processor operative to detect the mismatch by failing to decrypt the encrypted downlink frame using the first WEP key.

15. The wireless communications device according to claim 11, the processor operative to conduct the encrypted communications with the AP and to detect the mismatch by repeatedly, within a window of time: encrypting an uplink frame using the first WEP key, transmitting the encrypted uplink frame to the AP, and failing to receive acknowledgment of receipt of the uplink frame from the AP.

16. The wireless communications device according to claim 15, wherein the uplink frame includes a dynamic host control protocol (DCHP) request.

17. The wireless communications device according to claim 15, wherein the uplink frame includes an address resolution protocol (ARP) request.

18. The wireless communications device according to claim 11, the processor operative to disassociate from the AP responsive to detecting the mismatch.

19. The wireless communications device according to claim 11, the processor operative to generate a user notification responsive to detecting the mismatch.

20. A wireless communications device, comprising:
one or more radio circuits;
a memory;
a processor coupled to the one or more radio circuits and the memory, the processor operative to:
- store a first wired equivalent privacy (WEP) key at the wireless communications device in connection with a profile, the profile indicating an open system security type and a network name;
- successfully authenticate and associate with an access point (AP), thus joining a wireless local area network (WLAN) supported by the AP, the WLAN having the network name, the WLAN supporting the open system security type, and the WLAN requiring a second WEP key for encryption;
- subsequent to joining the WLAN, request an Internet Protocol (IP) address from a dynamic host control protocol (DHCP) server;
- responsive to requesting the IP address, receive an indication of IP address acquisition failure; and
- responsive to receiving the indication of IP address acquisition failure, ban the profile.

* * * * *